Patented Nov. 9, 1943

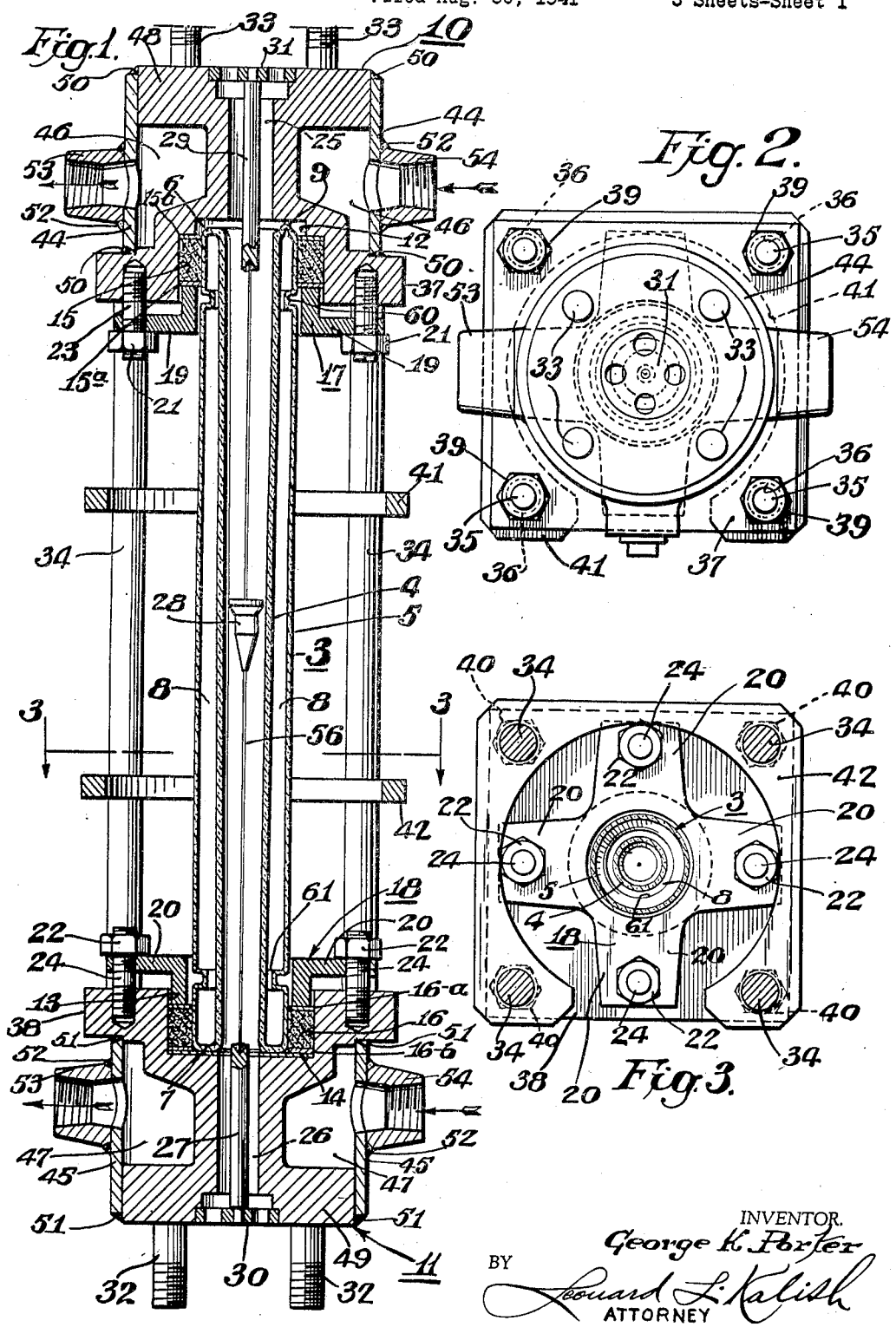

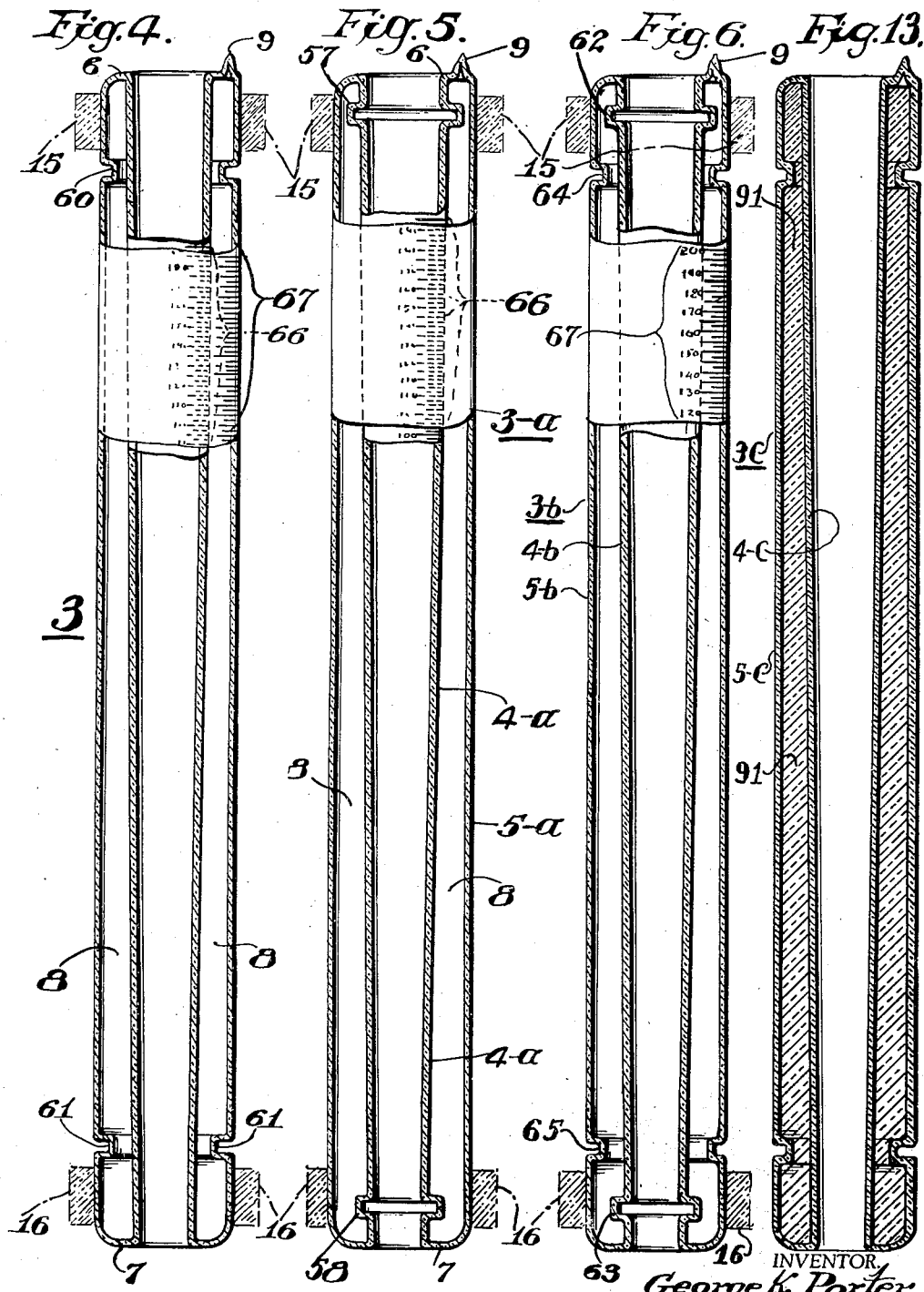

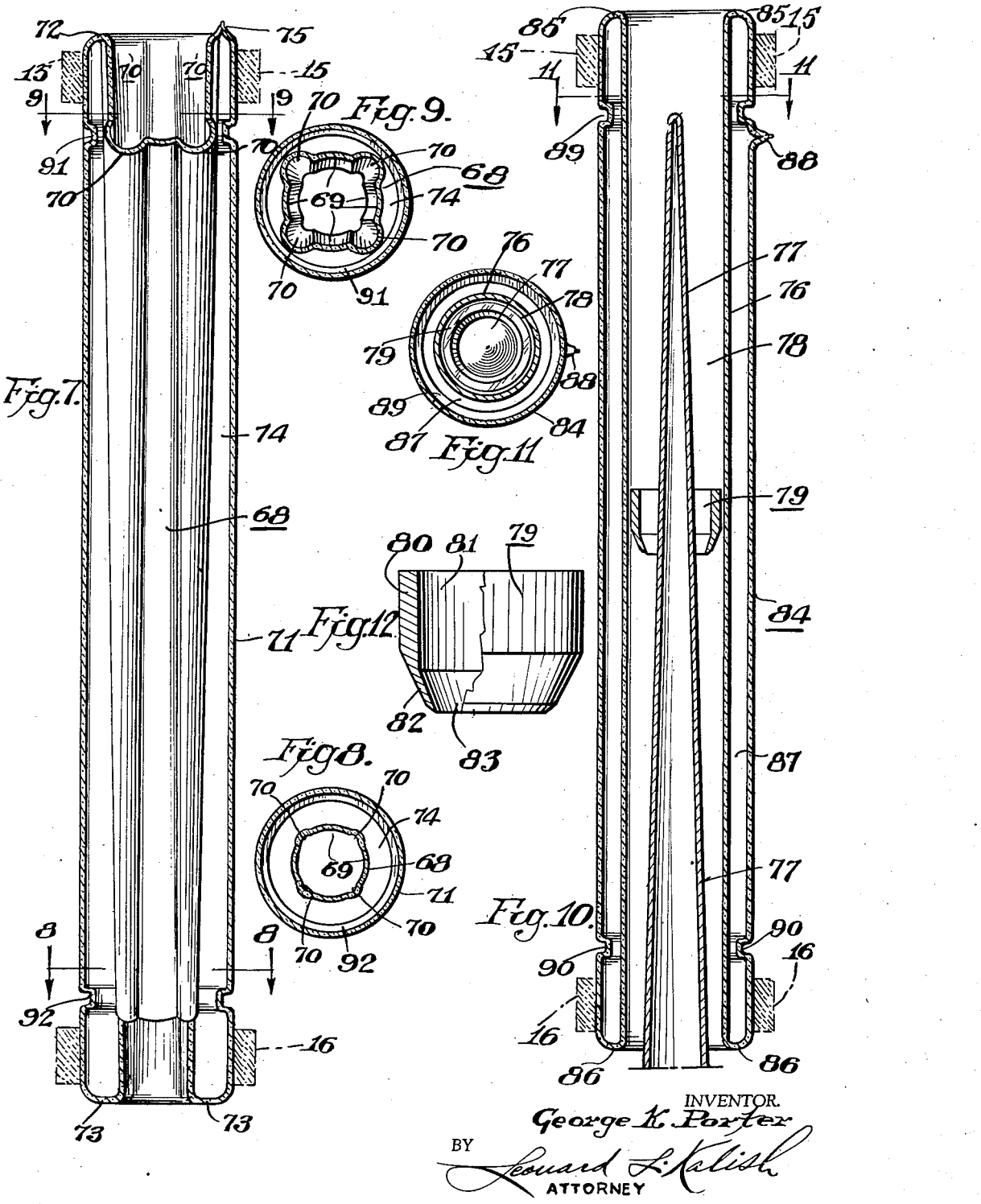

2,333,884

UNITED STATES PATENT OFFICE 2,333,884

FLOW-INDICATING FLUID METER

George K. Porter, Hatboro, Pa., assignor, by mesne assignments, to Fischer & Porter Company, Hatboro, Pa., a corporation of Pennsylvania Application August 30, 1941, Serial No. 409,051

17 Claims. (Cl. 73—209)

The present invention relates to flow meters and particularly to flow meters of the type in which the position of a flow-indicating float, disposed in a generally upright metering tube, indicates the rate of flow of fluid passing through the meter.

Flow meters of this type are sometimes generically referred to as "rotameters" owing to the fact that the free float is sometimes adapted to be rotated by the flow of fluid past the float.

One of the objects of the present invention is to provide a rotameter suitable for fluids which tend to congeal or coagulate or materially to change their viscosity while passing through the now-conventional tapered glass tubes, as for instance, hot fluid paraffin or similar liquids which would change their viscosity and may deposit a solid film on the inner tapered wall of the rotameter tube upon any slight reduction in temperature while passing through the rotameter tube or upon any slight chilling.

Another object of the present invention is to provide a rotameter in which the chilling or changing of temperature of the fluid in the rotameter tube is eliminated or, at least, minimized to the point where it cannot interfere with the operation of the rotameter and where it cannot materially affect the accuracy of the reading thereof.

With the above and other objects in view, the present invention consists of a rotameter having its tapered measuring tube formed as the inner wall of a co-axial double-walled tube with a space between the two co-axial tubular walls completely sealed and substantially evacuated to a degree sufficient materially to insulate against heat transference in either direction either by convection or conduction and also to reduce, to some extent, heat transference by radiation.

A further phase of the present invention may also include jacketed tube sockets or fittings for receiving the ends of a tube and for making connection with the pipe ends through which the fluid is received into the rotameter and through which the fluid is carried away from the rotameter.

Further phases of the present invention may also include other novel features and details of construction, all of which will appear more fully from the following detailed description, appended claims and accompanying drawings.

For the purpose of illustrating the invention, there are shown in the accompanying drawings forms thereof which are at present preferred, since the same have been found in practice to give satisfactory and reliable results, although it is to be understood that the various instrumentalities of which the invention consists can be variously arranged and organized and that the invention is not limited to the precise arrangement and organization of the instrumentalities as herein shown and described.

Referring to the drawings in which like reference characters indicate like parts:

Figure 1 represents a vertical cross-sectional view of a rotameter embodying the present invention.

Figure 2 represents a top plan view of the rotameter shown in Figure 1.

Figure 3 represents a horizontal cross-sectional view generally along the line 3—3 of Figure 1.

Figure 4 represents a vertical cross-sectional view, on a somewhat enlarged scale, of the rotameter tube shown in Figure 1.

Figure 5 represents a vertical cross-sectional view of another form of rotameter tube which may be used in place of the tube shown in Figure 4.

Figure 6 represents a vertical cross-sectional view of still another rotameter tube forming part of the present invention.

Figure 7 represents a front elevational view, partly in cross-section, of another embodiment of the present invention.

Figure 8 represents a cross-sectional view generally along the line 8—8 of Figure 7.

Figure 9 represents a cross-sectional view generally along the line 9—9 of Figure 7.

Figure 10 represents a vertical cross-sectional view of still another embodiment of the present invention.

Figure 11 represents a cross-sectional view generally along the line 11—11 of Figure 10.

Figure 12 represents an elevational view on a somewhat enlarged scale of the float shown in Figure 10; parts being broken away better to reveal the construction thereof.

Figure 13 represents a vertical cross-sectional view of a rotameter tube generally the same as that shown in Figure 4 except that the annular enclosed space intermediate the inner and outer tubes is filled with a synthetic plastic material.

Referring particularly to the embodiment shown in Figures 1 to 4, a metering tube, preferably made of glass, and designated generally by the numeral 3, is formed of two generally co-axial tubes 4 and 5 respectively, the inner tube 4 having the gradual taper common to rotameter tubes; and the outer tube 5 being preferably, though not necessarily, parallel or of uniform diameter. The tubes 4 and 5 are connected at their opposite ends by the annular transverse walls 6 and 7, also preferably made of glass.

This may be done by first forming the inner tube 4 in the usual manner and superimposing thereon, in coaxial relation thereto, the outer tube 5, after one of the radial annular flanges 6 or 7 has been flared outwardly from the inner tube or inwardly from the outer tube to meet the other tube and then uniting the end of one tube with the flange of the other. This uniting operation is then repeated at the opposite ends of the pair of coaxial tubes so as to form a completely enclosed hollow space 8 of suitable radial extent between the two tubes 4 and 5.

A pair of annular grooves 60 and 61 are formed in the outer tube 5, near the upper and lower ends thereof respectively before said tube 5 is joined to the inner tube 4. The function of the annular grooves 60 and 61 will be hereinafter described in detail. The annular grooves 60 and 61 extend preferably radially inward of said tube 5.

Either before or after the two tubes 4 and 5 have been united into the unitary structure 3, a glass tube inlet or suction nipple is fused at any suitable point, as for example, upon the upper transverse wall 6. The space 8 is evacuated, through the glass tube inlet, to any substantial extent, as for instance, to an absolute pressure of more or less approximately 10 to 20 millimeters of mercury. Thereafter, the exhausting tube connection is sealed off by a flame and removed so as to leave behind just the closure projection 9.

While, in the drawings, the closure projection or sealed tip 9 is shown as being placed at the upper transverse wall 6, the glass inlet tube may be formed upon the sides of the outer tube 5 adjacent either the upper or the lower ends thereof or said glass inlet tube may be formed on the lower transverse wall 7. In such cases, the closure projection 9 would be formed on the outer tube 5 or the lower transverse wall 7 respectively.

The double-walled vacuum rotameter tube 3 thus formed is then placed between upper and lower juxtaposed terminal members 10 and 11, respectively, formed of any suitable metal or other material according to the fluid to be metered, which terminal members 10 and 11 may be referred to as the "flanges" or terminal fittings. Each of said terminals 10 and 11 is provided with a socket recess 12 and 13 respectively, into which the ends of the tube 3 extend. The lower end of the tube is preferably supported on the washer 14, and the tube ends are then surrounded by upper and lower resilient and axially compressible and radially extensible packing members 15 and 16, respectively; each of said members 15 and 16 being interposed between pairs of similar washers 15—a and 15—b and 16—a and 16—b, respectively. Similar annular upper and lower stuffing glands 17 and 18, having bolt flanges or lugs 19 and 20, respectively, are superimposed upon the pairs of washers 15—a and 15—b and 16—a and 16—b and the intervening annular packing members 15 and 16 and are then tightened down to the desired extent by nuts 21 and 22 on the studs 23 and 24 respectively.

The terminal members 10 and 11 are provided with generally central ducts 25 and 26, respectively, forming continuations of the interior tapered passageway of the tube 3; the duct 26 delivering the fluid to the lower inlet end of the measuring tube 3 and the duct 25 conducting the fluid away from the upper outlet end of said tube 3. A stop or float-rest 27 is positioned within said lower duct 26 and extends upwardly therein to more or less approximately the lower end thereof. The stop 27 serves to receive the float 28 when there is no flow of fluid through the inner tube 4 or when the flow is so slight as to be insufficient to lift the float 28. An upper stop rod 29 is positioned within the upper duct 25 and may extend slightly into the upper end of the inner tube 4. The upper stop rod 29 serves as an upper limit for the float 28, thus preventing the float 28 from rising out of the tube 4 when, for any reason, the rate of flow exceeds the maximum metering capacity of the meter.

The stop rods 27 and 29 are carried by suitable spiders or spacer rings 30 and 31, respectively.

Lower and upper stud bolts 32 and 33, on the terminal members 11 and 10, serve to receive the pipe flanges or coupling flanges of the pipe line in which the rotameter is to be installed or mounted.

The two terminal members 10 and 11 are rigidly united in aligned and spaced relation to each other by a plurality (as, for instance, four) of spacers and tie rods 34, which are provided with reduced-diameter threaded portions 35 which extend through correspondingly diametered holes 36 in flange portions 37 and 38 of the terminal members 10 and 11, respectively; said tie rods 34 being secured by correspondingly threaded nuts 39 and 40 threaded on the projecting ends of the threaded portions 35 upon the outer sides of said flange portions 37 and 38 respectively.

Generally U-shaped upper and lower metallic members 41 and 42 are snugly fitted about the rods 34, intermediate the upper and lower terminal fittings 10 and 11; the rods 34 passing through matching openings in said U-shaped members 41 and 42. The U-shaped members serve to impart greater rigidity to the whole assembly as well as to afford a measure of protection for the tube 3. The U-shaped members 41 and 42 may be locked in position against vertical displacement by suitable set screws (not shown) adapted to be tightened against one or more of said rods 34.

As a further phase of the present invention, a jacket 44 may be provided intermediate the assembly flange 37 and the uppermost coupling flange 48 of said upper terminal member 10. The jacket 44 thereby provides an annular recess 46 intermediate said flanges 37 and 48 and surrounding the central fluid duct 25.

A similar jacket 45 may be provided intermediate the assembly flange 38 and the lowermost coupling flange 49 of the lower terminal member 11. The jacket 45 thereby provides an annular recess 47 intermediate said flanges 38 and 49 and surrounding the central fluid duct 26.

The jackets 44 and 45 are preferably formed of tubular metal. The jacket 44 is preferably secured to the flanges 37 and 48 by annular weld lines 50, while the jacket 45 is similarly secured to flanges 38 and 49 by annular weld lines 51.

A pair of pipe nipples or bosses 53 and 54 are then provided in the jacket 44, through which a heating fluid or a chilling fluid (as the case may be) may be circulated continuously within the annular recess 46. Similar nipples or bosses 53 and 54 are also provided in the lower jacket 45 to permit circulation of a heating fluid or a chilling fluid in the annular recess 47. The nipples 53 and 54 may be secured to the jackets 44 and 45 by peripheral weld lines 52.

The heating or cooling fluid may come from any suitable source and is employed to maintain the temperature of the terminal members 10 and 11 at a point suitable for the fluid to be measured, thereby to prevent the raising or lowering of the temperature of the fluid to be measured, either immediately preceding its entry into the metering tube 3 or directly after leaving the metering tube 3.

A conventional float 28 may be disposed within the inner tube 4 and may be adapted for vertical movement therein. A taut guide-wire 56 may extend between the lower and upper stops 27 and 29 generally along the axis of the tube 4; said float 28 being loosely fitted about said guide wire 56 and being held against transverse displacement thereby.

The annular grooves 60 and 61 formed in the outer tube 5, adjacent the upper and lower ends thereof, serve to prevent breakage of the metering tube 3. When the metering tube 3 is being used to measure the rate of flow of a fluid which is being maintained either at an appreciably lower or higher temperature than the temperature outside of the tube 3, it is apparent that the inner tube 4 will, after any period of operation, attain a temperature either appreciably higher or appreciably lower than the temperature of the outer tube 5. Thus, the inner tube 4 will tend either to expand or to contract in axial dimension, with respect to its original axial dimension and with respect to the axial dimension of the outer tube 5. Since the tubes 4 and 5 are more or less rigidly connected to each other at both ends thereof, any appreciable lengthening or shortening of the inner tube 4 with respect to the length of the outer tube 5 will create a strain therebetween and, if the temperature differential is sufficiently great, may result in a breakage of the metering tube 3.

The annular grooves 60 and 61, formed in the outer tube 5, tend to prevent or greatly to minimize the danger of breakage of the tube 3. By reason of the grooves 60 and 61 therein, the outer tube 5 is no longer axially rigid since it can assume a greater or smaller over-all axial dimension when a suitable force is applied at the ends thereof; the grooves 60 and 61 tending to open or close accordion-fashion when the ends of the tube 5 are pulled out or pushed in. In this way, the outer tube 5 can adjust itself readily to the varying length of the inner tube 4.

When the inner tube 4 is used in metering a relatively cold fluid, it tends to contract in axial dimension. This contraction is transmitted by the annular transverse walls 6 and 7 to the outer tube 5 which in turn is contracted in axial dimension; the annular grooves 60 and 61 being somewhat closed from their normal configuration.

When, on the other hand, the inner tube 4 is used in metering a relatively hot fluid, it tends to increase in axial dimension. This extension is transmitted by the annular transverse walls 6 and 7 to the outer tube 5 which accommodates itself to the increased length; the grooves 60 and 61 being opened somewhat from their normal configuration.

I have found that by employing the annular grooves 60 and 61, a double-walled metering tube is obtained which is almost entirely free from the possibility of breakage due to handling of fluids at elevated or reduced temperatures.

In Figure 5, I have shown, generally in vertical cross-section, a metering tube 3—a which may be used in place of the metering tube 3 shown in Figures 1 and 4.

Metering tube 3—a is generally the same as tube 3 except that no annular grooves are formed on the outer tube 5—a, while upper and lower annular grooves 57 and 58 are formed on the inner tube 4—a instead. The grooves 57 and 58 extend preferably radially outwardly of the inner tube 4—a.

The grooves 57 and 58 of the tube 3—a function in generally the same way as the grooves 60 and 61 of the tube 3 to prevent breakage of the metering tube as might result from unequal lengthwise expansion or contraction of the inner and outer tubes when hot or cold fluids are being metered.

Thus, when the tube 3—a is being used to measure the rate of flow of a hot fluid, the inner tube 4—a tends to expand. However, the greatest portion of the increase in over-all length (which occurs intermediate the grooves 57 and 59) is taken up by the grooves 57 and 58; these grooves merely contracting accordion-fashion from their initial configuration.

In this way, the over-all length of the inner tube 4—a remains generally the same as it was originally and generally the same as the length of the outer tube 5—a so that no stress, as might break the tube 3—a, arises. When, on the other hand, the metering tube 3—a is used to measure the rate of flow of a cold liquid, the inner tube 4—a tends to contract in axial dimension. However, the greatest portion of the decrease in over-all length (which occurs intermediate the grooves 57 and 58) is taken up by the grooves 57 and 58; these grooves merely expanding accordion-fashion from their initial configuration. In this way, the over-all length of the inner tube 4—a remains generally the same as it was originally and generally the same as the length of the outer tube 5—a so that no stress, as might break the tube 3—a, arises.

In Figure 6 I have shown, generally in vertical cross-section, a metering tube 3—b which I may use in place of the tubes 3 and 3a. The metering tube 3—b includes an inner tube 4—b which has upper and lower annular, radially-outwardly extending grooves 62 and 63 at the ends thereof similar to the grooves 57 and 58 of the tube 3—a shown in Figure 5. The tube 3—b also includes an outer tube 5—b which has upper and lower annular, radially-inwardly extending grooves 64 and 65 generally the same as the grooves 60 and 61 of the metering tube 3 shown in Figure 4. The grooves 62 and 63 are preferably placed nearer the ends of the tube 3—b than are the grooves 64 and 65.

The metering tube 3—b also functions to minimize the danger of breakage due to unequal lengthwise expansion or contraction of the inner and outer tube 4—b and 5—b thereof when the tube 3—b is used to measure the rate of flow of hot or cold fluid.

When hot or cold fluids are being metered, the inner tube 4—b tends to expand or to contract in axial dimension. Most of this tendency is absorbed by the grooves 62 and 63 which close or open accordion-fashion to maintain the over-all length of the inner tube 4—b generally constant. However, if some slight variation in the over-all length of the inner tube 4—b does occur in spite of the grooves 62 and 63, the grooves 64 and 65 permit the outer tube 5—b to expand or to contract accordingly so that the possibility of any strain which might result in breakage of the metering tube 3—b is almost entirely eliminated.

Many other modifications of my present invention are possible and are within the scope thereof. Thus, the number of annular grooves in the inner or outer tubes might be varied depending upon the degree of expansion or contraction to which the metering tube is susceptible.

Furthermore, the grooves could be formed in other ways. Thus, the grooves in the outer tube might be formed to extend radially outwardly while the grooves in the inner tube might be formed to extend radially inwardly, although the form shown in the drawings is preferred. Similarly, the annular grooves instead of being generally U-shaped in cross-section as shown in the drawings, might have any other possible cross-section; as for example, a curved cross-section or a V-shaped cross-section, etc.

The metering tube is preferably graduated so that the position of the float 28 can be read off. The graduations may indicate rate of flow either by direct reading or by reference to a suitable calibration chart or graph.

The graduations 66 may be applied to the outer surface of the inner tube as shown in Figures 4 and 5; preferably by etching and subsequently applying a colored pigment to the etched markings. The inner tube may be thus graduated before it is enclosed within the outer tube. As shown in Figure 5, the graduations 66 upon the inner tube are preferred since they make for more accurate reading and eliminate the possibility of inaccuracy in readings as might result when the eye of the observer is above or below the float instead of being generally horizontal therewith.

However, it is possible to apply graduations 67 upon the outer tube instead of the inner tube, as shown in Figure 6. The graduations 67 are applied in the same way by etching and by applying pigment to the etched markings. The graduations 67 may be applied to the outer tube either before or after it is affixed to the inner tube. Where the graduations 67 upon the outer tube are alone used, care should be taken to make the readings directly at eye level as otherwise the angle of inclination of the eye will result in an error in the reading.

As shown in Figure 4, it is possible to apply graduations 66 upon the inner tube and also graduations 67 upon the outer tube. The inner and outer graduations are made to coincide exactly and, in this way, absolute accuracy of readings is assured. The observer, in making a reading, must bring three points in line, namely, the indicating edge of the float, the inner graduation and the outer graduation. Since the inner and outer graduations are on the same horizontal line, a reading is possible only when the eye of the observer is on the same horizontal line as the float as required for absolute accuracy. The inner tapered tube is preferably so calibrated that the highest graduation is placed some distance below the upper anular groove 57 (or 62). In this way, any slight distortion which might result in that part of the inner tube adjacent to the inner grooves during expansion or contraction will not affect the rotameter readings since the range of the meter terminates short of such possible distorted portions.

Where the outer of the tubes is provided with annular grooves, the calibrations should be spaced substantially away therefrom. That is, the uppermost graduations should be substantially below the upper groove while the lowest graduation should be substantially above the lower groove. This is preferable since the annular grooves in the outer tube tend to conceal the adjacent graduations and since some distortion may occur in the outer tube adjacent to the annular grooves as might produce sufficient optical refraction as to give incorrect readings.

I may also form a rotameter with a double glass wall measuring tube, in which the space between the two glass walls is filled with some transparent organic plastic material which may be cast or molded in situ and which will serve as a transparent reinforcement for the glass measuring tube so as to minimize the possibility of its breakage.

Thus, in Figure 13 there is shown a rotameter tube 3—c which is generally the same as the tube 3 of Figure 4 except that the annular enclosed space intermediate the inner tube 4—c and the outer tube 5—c is filled with a transparent synthetic plastic organic material 91.

In this phase of my invention, one or both of the transverse end walls 6 and 7 which connect the co-axial tubes 4 and 5 may be omitted entirely, because the spaced relationship of the two co-axial glass tubes will be maintained by the transparent organic material. Any of the many synthetic transparent organic materials may be used; the only requirement being that they shall be capable of being cast or condensed or solidified or molded in situ, and that the material when solidified shall be of non-shattering character, that is, one which will have some capacity to yield to distortion before rupturing. The synthetic organic material may be applied either through the thermo-setting qualities of the material itself or through a physical or chemical change taking place which solidifies or coagulates the substance. The organic material so cast or solidified in place between the two co-axial glass tubes will, if the glass tubes are perfectly clean, adhere to the surfaces thereof and tend to form a unitary structure therewith so as to prevent the free shattering of the glass and so as generally to resist breakage or fracture.

This modified embodiment of the present invention is particularly useful in high pressure lines or where the hazard of the breakage of a glass tube may be unusually great, as for instance, in the handling of highly volatile and highly inflammable or explosive liquids or in handling poisonous liquids whose accidental escape (through the breakage of the tube) may be very damaging.

As an example of the transparent organic plastic materials, I may use a polymerizable acrylate, as for instance, methyl acrylate, which in its unpolymerized condition is a thin fluid known as the monomeric methyl methacrylate and which may be poured into the space between the two co-axial glass tubes and then permitted to solidify by polymerization upon the application of heat. This solidified material is also known to the trade under the trade-mark "Plexiglas." As a further example of a transparent organic plastic material, I may also use some of the cast resins of the phenolic formaldehyde group, as for instance, that known under the trade-mark "Catalin."

In Figures 7, 8 and 9 I have shown another embodiment of the present invention in which an inner fluted metering tube 68 is employed. The tube 68 has a generally cylindrical central bore 69 and is provided with a plurality (as for example 4) of flutes 70 disposed circumferentially thereabout and extending axially of said tube 68. The flutes 70 are relatively small and shallow at the intake end of the tube 68 as shown in Figure 8 and become larger and deeper at the discharge end of the tube 68 as shown in Figure 9.

Any conventional float, as for example the float 28 shown in Figure 1, may be used with the tube 68. When there is only a slight flow of fluid through the tube 68, the float remains at the intake end of said tube at which point the shallow portions of the flutes 70 provide a relatively small cross-sectional area for fluid flow across the float. As the rate of flow increases, the float is moved toward the discharge end of the tube where the flutes become larger and deeper so that a larger cross-sectional area is available for fluid flow across the float.

An outer tube 71 may be provided about the inner fluted tube 68 and may be connected therewith by upper and lower transverse annular walls 72 and 73.

Upper and lower annular expansion grooves 91 and 92 may be formed extending radially inwardly from said outer tube 71. The expansion grooves may be formed in other ways; as for example, the ways hereinabove described with respect to the embodiments shown in Figures 1 to 6.

The outer tube 71 is preferably made cylindrical as shown in Figures 7, 8 and 9 or the tube may be made generally the same shape as the inner tube 68 but with larger cross-section.

The annular space 74 intermediate the tubes 68 and 71 may be evacuated in the same way as the embodiment shown in Figure 1; the evacuating tip being finally removed and the opening closed by melting the glass to give the closure tip or projection 75 at any convenient point, as for example in the upper transverse wall 72 as shown in Figure 7.

In Figures 10 and 11 I have shown still another embodiment of the present invention in which an inner generally cylindrical metering tube 76 is employed with a tapered inner post, rod or tube 77 co-axially disposed within said cylindrical tube 76; an annular metering chamber 78 of varying cross-section being thus provided intermediate said cylindrical tube 76 and said inner rod 77.

A float 79 is adapted to move vertically within the annular metering chamber 78. The float 79 is provided with a tubular body portion 80 disposed generally adjacent to the cylindrical metering tube 76; the central opening 81 of said body portion 80 being recessed substantially away from the tapered inner rod or post 77.

An annular tapered "head" 82 extends from one end of the body portion 80 and terminates in a central generally circular head-opening 83. The head-opening 83 has a diameter approximating the largest diameter of the inner tapered rod or tube 77. The head 82 is inclined in the direction of the oncoming fluid so that the head-opening 83 is closer to the inlet end of the flow meter than is the body portion 80 of said float 79.

When there is little or no fluid flow, the float 79 is at the inlet end of the flow meter at which only a slight annular clearance exists between the head-opening 83 and the larger end of the tapered inner rod or tube 77. When the fluid flow increases, the float is forced toward the discharge end of the flow meter at which a relatively larger annular clearance is provided between the head-opening 83 and the smaller end of the tapered rod or tube 77. A very slight annular clearance is maintained between the outer surface of the body portion 80 and the inner surface of the metering tube 76; this slight clearance being the same regardless of the position of the float.

In this way, the embodiment shown in Figures 10, 11 and 12 serves to measure rate of flow; the position of the float determining the cross-sectional area of the annular clearance available for fluid flow thereacross and being a measure of the rate of flow.

An outer tube 84 is provided about said inner metering tube 76 and is connected thereto by upper and lower transverse annular walls 85 and 86.

The annular space 87 intermediate the tubes 76 and 84 is exhausted in the same way as hereinabove described; the closure projection 88 being provided at any suitable point as for example at the upper end of said outer tube 84.

Upper and lower annular expansion grooves 89 and 90 may be provided in said outer tube 84 as shown in Figures 10 and 11.

While said expansion grooves 89 and 90 are shown as extending radially inwardly on said outer tube 84, such expansion grooves may be formed in other ways, as for example extending radially outwardly on said outer tube 84 or being formed on the inner tube 76. It is also possible to form expansion grooves on both the inner and outer tubes.

While the outer jacketing tube has been shown as being generally cylindrical in the drawings, such outer tube could be made in many other forms without departing from the spirit of the present invention.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

The invention having been thus described, what is hereby claimed to be new and desired to be secured by Letters Patent is:

1. A rotameter for measuring fluid flow including a pair of co-axially disposed glass tubes united to each other at their ends to form a completely enclosed annular space therebetween, said annular space being substantially evacuated; the inner bore of the inner tube being conically tapered and being calibrated for fluid-flow capacity.

2. A fluid flow meter including a pair of co-axial and spaced tubes of transparent material united to each other at their ends to form a completely enclosed annular space therebetween, said annular space being substantially evacuated, and a terminal fitting at one end of said pair of transparent tubes, said fitting having a conduit connecting with the inner of said coaxial tubes, said fitting having a jacket surrounding said conduit adapted for the circulation therethrough of temperature-maintaining fluid, the inner of said tubes being adapted for passage therethrough of fluid being metered and having an intermediate portion thereof calibrated for fluid-flow capacity.

3. A rotameter including a pair of co-axially disposed glass tubes in spaced relation to each other, the inner tube having a gradual taper therein, and a transparent and generally solid and non-shattering organic material generally filling the space between said co-axially disposed glass tubes, said organic material being generally in intimate contact with the inner wall of the outer tube and with the outer wall of the inner tube and tending to unite said tubes.

4. A rotameter for measuring fluid flow including a pair of co-axial and spaced transparent tubes united to each other at their ends to form a completely enclosed and substantially evacuated annular space therebetween, one of said tubes having an annular groove adjacent one end thereof, the inner of said tubes being adapted for passage of fluid therethrough and having a calibrated uniformly axially varying cross-sectional area available for fluid flow.

5. A rotameter for measuring fluid flow including a pair of co-axial and spaced transparent tubes united to each other at their ends to form a completely enclosed and substantially evacuated annular space therebetween, one of said tubes having an annular groove therein adjacent each end thereof, the inner of said tubes being adapted for passage of fluid therethrough and having a calibrated uniformly axially varying cross-sectional area available for fluid flow.

6. A rotameter for measuring fluid flow including a pair of co-axial and spaced transparent tubes united to each other at their ends to form a completely enclosed and substantially evacuated annular space therebetween, the outer of said tubes having an annular groove therein adjacent one end thereof, the inner of said tubes being adapted for passage of fluid therethrough and having a calibrated uniformly axially varying cross-sectional area available for fluid flow.

7. A rotameter for measuring fluid flow including a pair of co-axial and spaced transparent tubes united to each other at their ends to form a completely enclosed and substantially evacuated annular space therebetween, the inner of said tubes having an annular groove adjacent one end thereof and having a calibrated intermediate portion thereof, said intermediate portion having an axially uniformly varying cross-sectional area available for fluid-flow.

8. A rotameter for measuring fluid flow including a pair of co-axial and spaced transparent tubes united to each other at their ends to form a completely enclosed and substantially evacuated annular space therebetween, the outer of said tubes having an annular groove therein adjacent each end thereof, the inner of said tubes being adapted for passage of fluid therethrough and having a calibrated uniformly axially varying cross-sectional area available for fluid flow.

9. A rotameter for measuring fluid flow including a pair of co-axial and spaced transparent tubes united to each other at their ends to form a completely enclosed and substantially evacuated annular space therebetween, each of said tubes having an annular groove at each end thereof, the inner of said tubes being adapted for passage of fluid therethrough and having a calibrated uniformly axially varying cross-sectional area available for fluid flow.

10. A rotameter adapted for measuring rate-of-flow of fluids having a higher or lower temperature than the temperature outside of the flow meter, including a pair of coaxial and spaced transparent tubes united to each other at their ends to form a completely enclosed substantially evacuated annular space therebetween, and means forming a part of said tubes for maintaining them at substantially the same over-all length regardless of temperature differences between the inner and outer of said co-axial tubes, the inner of said tubes having a calibrated intermediate portion of axially uniformly varying cross-sectional area available for fluid flow.

11. A flow meter adapted for measuring rate-of-flow of fluids having a higher or lower temperature than the temperature outside of the flow meter, including a pair of co-axial and spaced transparent tubes united to each other at their ends to form a completely enclosed substantially evacuated annular space therebetween, and means forming a part of the outer of said tubes for permitting substantial increase or decrease in the over-all length thereof under physical stress, whereby the outer of said tubes can adapt itself to variations in over-all length of the inner of said tubes caused by temperature variations thereof, the inner of said tubes having a calibrated axially-fluted portion available for fluid flow.

12. A rotameter adapted for measuring rate-of-flow of fluids having a higher or lower temperature than the temperature outside of the flow meter, including a pair of co-axial and spaced transparent tubes united to each other at their ends to form a completely enclosed substantially evacuated annular space therebetween, and means forming a part of the inner of said tubes for maintaining the over-all length thereof substantially constant regardless of temperature variations thereof, the inner of said tubes having a calibrated intermediate portion of axially uniformly varying cross-sectional area available for fluid flow.

13. A rotameter adapted for measuring rate-of-flow of fluids having a higher or lower temperature than the temperature outside of the flow meter, including a pair of co-axial and spaced transparent tubes united to each other at their ends to form a completely enclosed substantially evacuated annular space therebetween, means forming a part of the inner of said tubes for maintaining its over-all length substantially constant regardless of temperature variations thereof, and means forming a part of the outer of said tubes permitting substantial increase or decrease in its over-all length under physical stress, the inner of said tubes having a calibrated intermediate portion of axially uniformly varying cross-sectional area available for fluid flow.

14. A rotameter adapted for measuring rate-of-flow of fluids having a higher or lower temperature than the temperature outside of the flow meter, including a pair of co-axial and spaced transparent tubes united to each other at their ends to form a completely enclosed substantially evacuated annular space therebetween, means forming a part of said tubes for maintaining them at substantially the same over-all length regardless of temperature differences between the inner and outer of said co-axial tubes, and a terminal fitting operatively disposed at each end of said tubes, each of said fittings having a conduit connecting with the inner of said tubes and having a jacket surrounding said conduit for circulating temperature-maintaining fluid thereabout, the inner of said tubes having a calibrated intermediate portion of axially uniformly varying cross-sectional area available for fluid flow.

15. A flow meter adapted for measuring the rate-of-flow of fluids at relatively higher or relatively lower temperatures than the temperature outside of the flow meter including a pair of co-axial and spaced transparent tubes united to each other at their ends to form a completely enclosed substantially evacuated annular space therebetween, the inner of said tubes having a conical taper, means forming a part of the outer of said tubes permitting substantial increase or decrease in its over-all length under physical stress whereby the outer of said tubes can more readily adapt itself to variations in the length of the inner of said tubes caused by said higher or lower temperatures, and a terminal fitting operatively disposed at each end of said tubes, each of said fittings having a conduit connecting with the inner of said tubes and having a jacket surrounding said conduit for circulating temperature-maintaining fluid thereabout.

16. A flow meter adapted for measuring the rate-of-flow of fluids at relatively higher or relatively lower temperatures than the temperature outside of the flow meter including a pair of co-axial and spaced transparent tubes united to each other at their ends to form a completely enclosed heat-insulating annular space therebetween, the inner of said tubes having a conical taper, means forming a part of the outer of said tubes permitting substantial increase or decrease in its over-all length under physical stress whereby the outer of said tubes can more readily adapt itself to variations in the length of the inner of said tubes caused by said higher or lower temperatures, and a terminal fitting operatively disposed at each end of said tubes, each of said fittings having a conduit connecting with the inner of said tubes and having a jacket surrounding said conduit for circulating temperature-maintaining fluid thereabout.

17. A fluid flow meter of the float-gauge type including a pair of co-axial and spaced transparent tubes of transparent material integrally united to each other at their ends to form a completely enclosed space therebetween, the inner of said tubes being adapted for the passage of fluid therethrough and having a calibrated intermediate portion of axially uniformly varying cross-sectional area available for fluid flow.

GEORGE K. PORTER.